United States Patent
Spadaccini et al.

(10) Patent No.: US 6,709,492 B1
(45) Date of Patent: Mar. 23, 2004

(54) PLANAR MEMBRANE DEOXYGENATOR

(75) Inventors: Louis J. Spadaccini, Manchester, CT (US); Steven Lozyniak, South Windsor, CT (US); He Huang, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/407,004

(22) Filed: Apr. 4, 2003

(51) Int. Cl.$^7$ ............................................. B01D 19/00
(52) U.S. Cl. ......................... 96/6; 95/46; 96/13; 96/14
(58) Field of Search .................. 95/46, 54; 96/4, 96/6, 7, 9, 12–14

(56) References Cited

U.S. PATENT DOCUMENTS

| | | | |
|---|---|---|---|
| 3,751,879 A | | 8/1973 | Allington |
| 4,613,436 A | * | 9/1986 | Wight et al. ............... 210/232 |
| 4,788,556 A | * | 11/1988 | Hoisington et al. ........... 347/92 |
| 4,853,013 A | * | 8/1989 | Rio et al. ........................ 96/6 |
| 4,999,107 A | * | 3/1991 | Guerif ....................... 210/224 |
| 5,238,547 A | * | 8/1993 | Tsubouchi et al. .............. 96/3 |
| 5,693,122 A | * | 12/1997 | Berndt ............................ 96/6 |
| 5,830,261 A | * | 11/1998 | Hamasaki et al. .............. 96/6 |
| 5,876,604 A | | 3/1999 | Nemser et al. |
| 5,888,275 A | | 3/1999 | Hamasake et al. |
| 5,980,742 A | * | 11/1999 | Saitoh .................... 210/198.2 |
| 6,126,723 A | * | 10/2000 | Drost et al. ...................... 96/4 |
| 6,126,725 A | * | 10/2000 | Tateyama ........................ 96/6 |
| 6,258,154 B1 | | 7/2001 | Berndt et al. |
| 6,309,444 B1 | * | 10/2001 | Sims et al. ...................... 95/46 |
| 6,315,815 B1 | | 11/2001 | Spadaccini et al. |
| 6,332,913 B1 | * | 12/2001 | Breitschwerdt et al. ........ 95/55 |
| 6,558,450 B2 | * | 5/2003 | Sengupta et al. ............. 95/46 |
| 2001/0037731 A1 | * | 11/2001 | Sims et al. ...................... 96/6 |
| 2003/0010213 A1 | * | 1/2003 | Gerner et al. ................. 96/193 |
| 2003/0066426 A1 | * | 4/2003 | Ujita et al. ...................... 96/6 |

FOREIGN PATENT DOCUMENTS

GB     2229650 A   *   10/1990

OTHER PUBLICATIONS

Louis J. Spacaccini and He Huang: Proceedings of TURBO EXPO 2002 ASMI: Turbo Expo: Land. Sea & Air 2002 Jun. 3–6, 2002, Amsterdam, The Netherlands GT–2002–30071.

* cited by examiner

Primary Examiner—Robert H. Spitzer
(74) Attorney, Agent, or Firm—Carlson, Gaskey & Olds (57) ABSTRACT

A fuel deoxygenator includes a plurality of fuel plates defining fuel passages through a housing. A permeable membrane supported by a porous substrate is in contact with fuel flowing through the fuel passages. A vacuum in communication with the porous substrate creates a differential pressure between oxygen within the fuel and the porous membrane. The oxygen partial pressure differential causes oxygen dissolved within the fuel to migrate from the fuel through the permeable membrane away from the fuel. Fuel exiting the outlet includes a substantially reduced amount of dissolved oxygen.

23 Claims, 6 Drawing Sheets

PLANAR MEMBRANE DEOXYGENATOR

BACKGROUND OF THE INVENTION

This invention relates generally to a method and device for removing dissolved oxygen from fuels and specifically to a planar membrane for removing dissolved oxygen from liquid hydrocarbon fuels.

Figure 1:
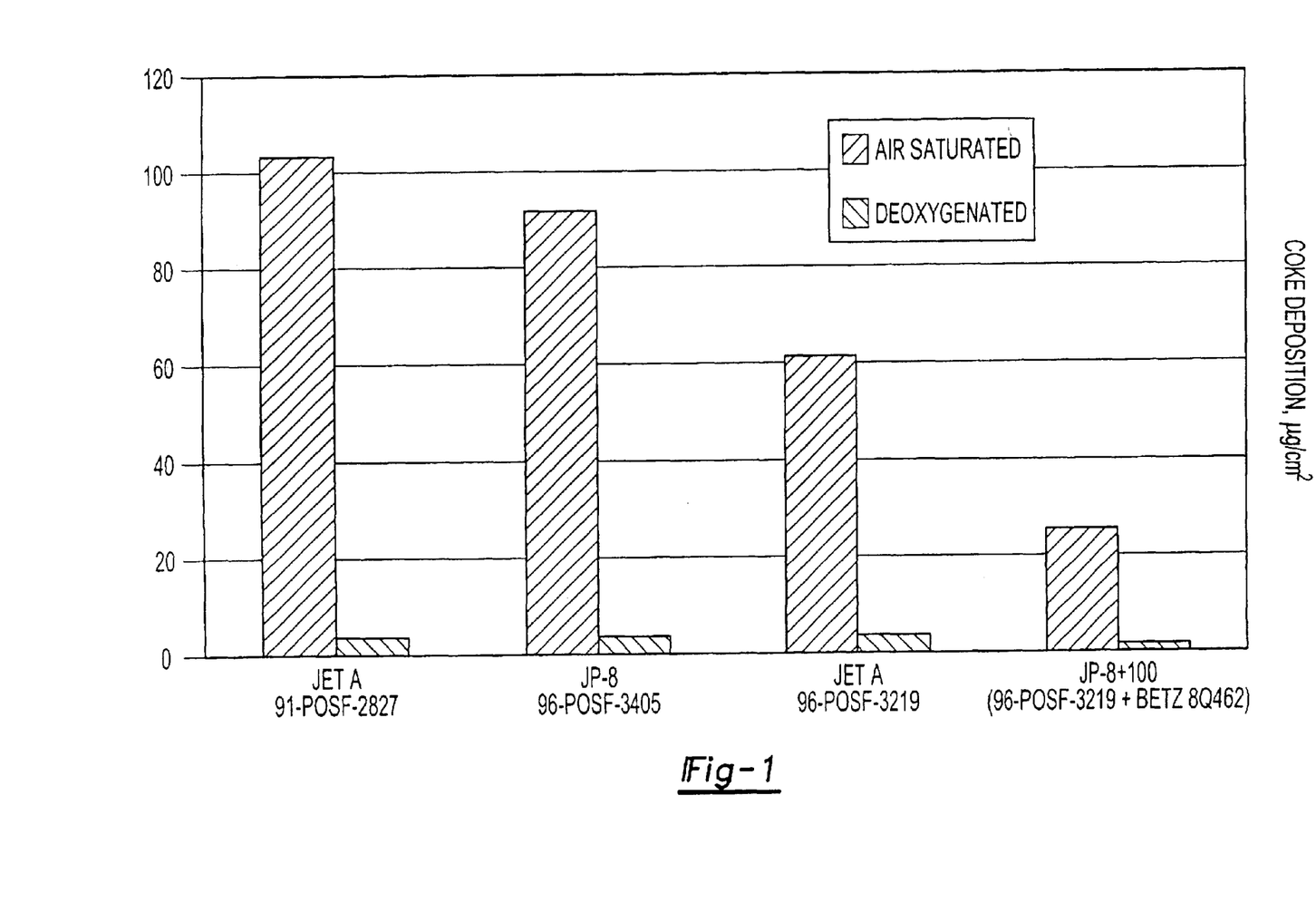
FIG. 1 is a graph illustrating examples of Deoxygenation suppressing coke formation.

It is common practice to use fuel as a cooling medium for various systems onboard an aircraft. The usable cooling capacity of a particular fuel is limited by coke deposition, which is dependent on the amount of dissolved oxygen present within the fuel due to prior exposure to air. Reduction of the amount of dissolved oxygen within the fuel can result in the reduction of coke formed within the fuel delivery and injection system of the aircraft engine. Increasing the temperature of fuel also increases the rate of the oxidative reaction that occurs. It has been determined that decreasing the amount of dissolved oxygen present within the jet fuel reduces the formation of insoluble products referred to as "coke" or "coking". FIG. 1 illustrates the amount of coke formation for various grades of aircraft fuels. As appreciated from a study of the graph, deoxygenation suppresses coke formation across various aircraft fuel grades. Reducing the amount of oxygen dissolved within the jet fuel decreases the rate of coke deposition and increases the maximum allowable temperature. In other words, the less dissolved oxygen within the fuel, the higher the temperature before coke buildup becomes a problem. For many fuels, in order to suppress coke deposition, it is generally agreed that the concentration of dissolved oxygen should be reduced below approximately 2 ppm or approximately three percent of saturation. Aircraft fuels that currently have improved coking performance are generally more expensive or require additives, and therefore are not always available.

U.S. Pat. No. 6,315,815, assigned to Assignee of the current application, discloses a device for removing dissolved oxygen using a tubular gas-permeable membrane disposed within the fuel system. Fuel flows through tubes having an inner surface comprising a permeable membrane. As fuel passes along the permeable membrane, oxygen molecules in the fuel dissolve into the membrane and then diffuse across it and are removed A vacuum or oxygen partial pressure differential across the permeable membrane drives oxygen from the fuel, which is unaffected and passes over the membrane.

As is appreciated tubular membranes are difficult to manufacture and are limited in size and construction by tubing sizes and economic factors. Tubular membrane bundles are difficult to scale because performance is highly dependent on spacing and geometry and thus hard to predict. High pressures are also a concern with tubular membranes. Further, space and weight are driving factors for any system installed on an airframe, and any reduction in space and weight provide immediate benefits to the operation of the aircraft.

Accordingly it is desirable to design a permeable membrane system that can remove dissolved oxygen from fuel down to the level required to suppress coke formation, and to configure it such that it efficiently utilizes space, reduces weight, is easily scalable, performs predictably, and can be manufactured economically.

SUMMARY OF THE INVENTION

This invention is a fuel deoxygenator assembly including a fuel plate that defines fuel flow passages between a fuel inlet and outlet. The fuel plate is sandwiched between permeable membranes backed by a porous plate. An oxygen concentration gradient partial pressure differential created between fuel within the fuel flow passages and the porous plate provides the driving force or chemical potential to draw dissolved oxygen from fuel through the permeable membrane to reduce the dissolved oxygen content of the fuel. The oxygen concentration gradient is manifested by the partial pressure differential of the oxygen and drives the oxygen through the membrane.

The fuel deoxygenator assembly includes a plurality of fuel plates sandwiched between permeable membranes and porous backing plates disposed within a housing. Each fuel plate defines a portion of the fuel passage and the porous plate backed permeable membranes define the remaining portions of the fuel passages. The permeable membrane includes Teflon or other type of amorphous glassy polymer coating in contact with fuel within the fuel passages for preventing the bulk of liquid fuel from migrating through the permeable membrane and the porous plate. Trace amounts of fuel, nitrogen, and other gases may also migrate through the membrane without any deleterious effects.

The use of a plurality of similarly configured flat plates increases manufacturing efficiency and reduces overall cost. Further, the size and weight of the deoxygenator assembly is substantially reduced over prior art systems while increasing the capacity for removing dissolved oxygen from fuel. Moreover, the planar design is easily scalable compared to previous tubular designs.

Accordingly, the fuel deoxygenator assembly of this invention increases and improves the amount of dissolved oxygen that may be removed from fuel while also reducing the amount of space and weight required for accomplishing fuel deoxygenation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 2:
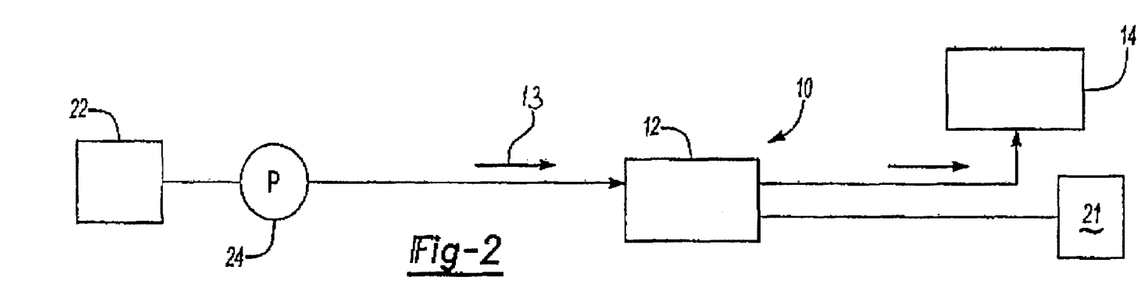
FIG. 2 is a schematic view of a fuel deoxygenation system.

Referring to FIG. 2, a fuel deoxygenator system 10 includes deoxygenator assembly 12 for removing dissolved oxygen from fuel flowing, indicated by arrow 13, to an engine 14. Fuel pump 24 pumps fuel from fuel tank 22 through the deoxygenator 12 to the engine 14. A vacuum source 21 creates an oxygen partial pressure differential that causes migration of dissolved oxygen out of fuel passing through the deoxygenator 12.

Figure 3:
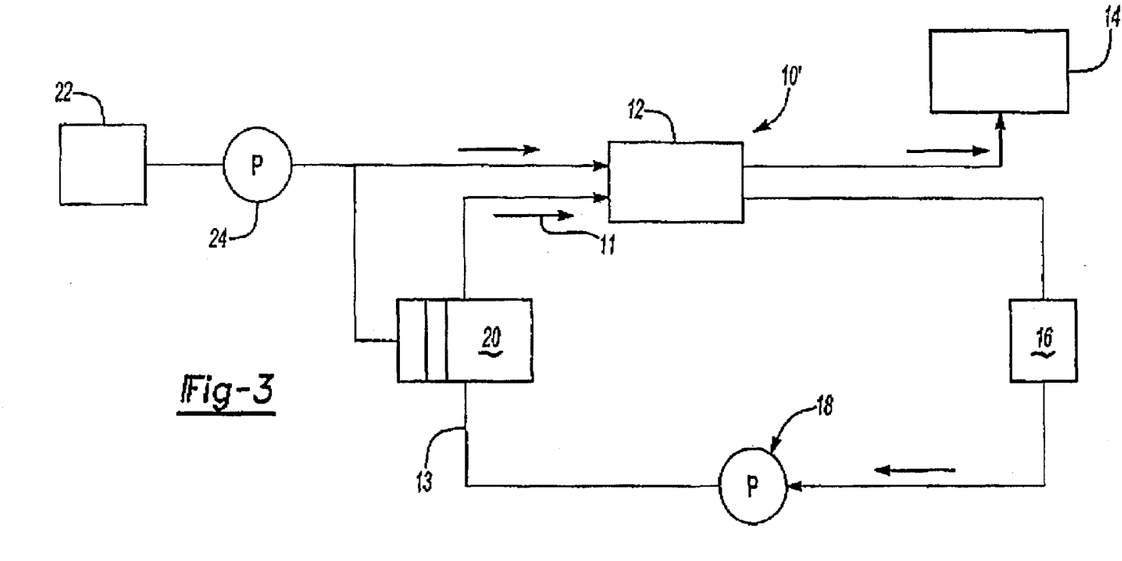
FIG. 3 is a schematic view of another fuel deoxygenation system.

Referring to FIG. 3, a second embodiment of a fuel deoxygenator system 10' is schematically illustrated. The oxygen partial pressure differential is controlled by the flow of an oxygen-free strip gas such as nitrogen, indicated by arrow 11, circulating through a separate circuit 13. Circulating pump 18 circulates the strip gas 11 through an accumulator 20 and the deoxygenator 12. Dissolved oxygen within the fuel migrates through the deoxygenator 12 and into the strip gas 11. A sorbent 16 then removes dissolved oxygen within the strip gas 11 that recirculates through the deoxygenator 12. The type of strip gas 11 used may be of any type known to a worker skilled in the art that does not contain oxygen. Further, the type of sorbent 16 for removing oxygen from the strip gas 11 may be of any type known to a worker skilled in the art.

The deoxygenator 12 is designed to operate in either system using a vacuum source 21 or a recirculating strip gas 11 for creating the partial pressure differential that pulls dissolved oxygen from fuel.

Figure 4:
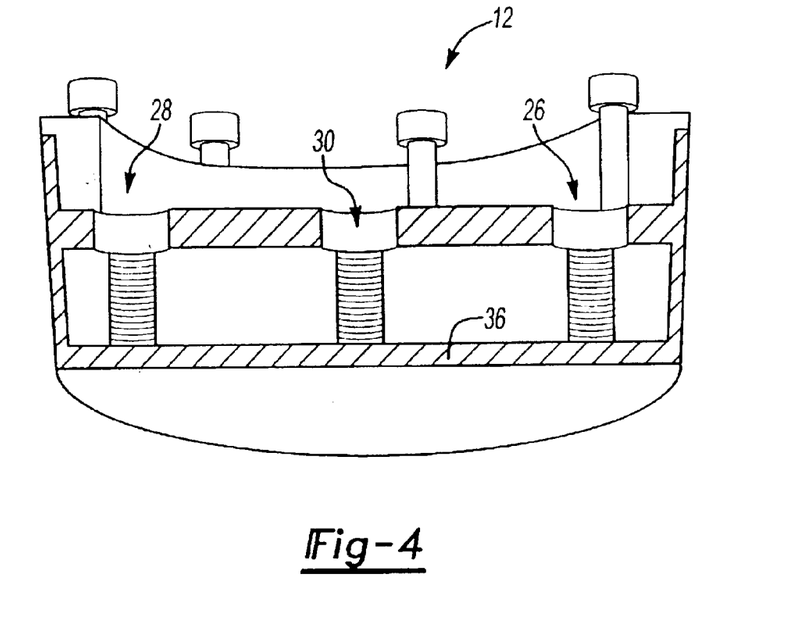
FIG. 4 is a cross sectional view of the fuel deoxygenator assembly.
Figure 5:
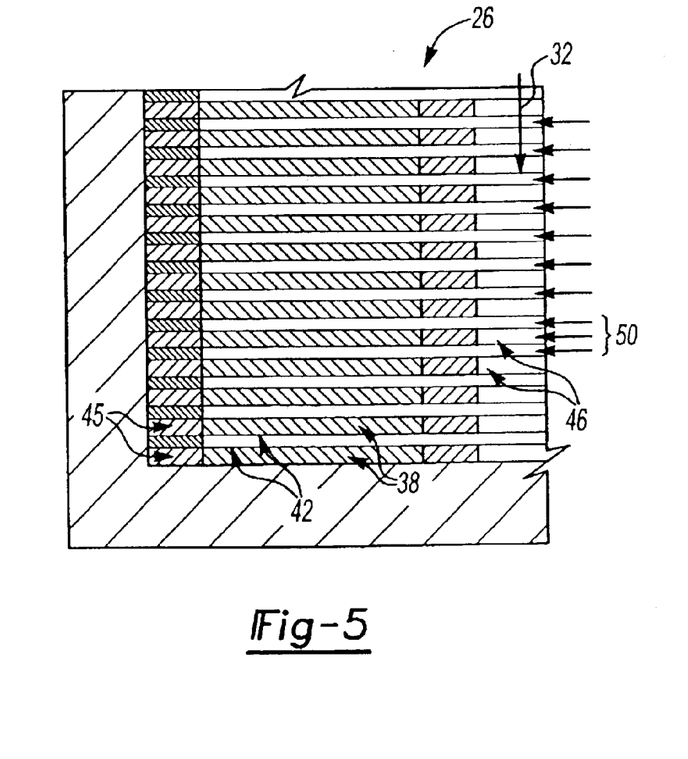
FIG. 5 is a cross sectional view of plates through the fuel inlet.
Figure 6:
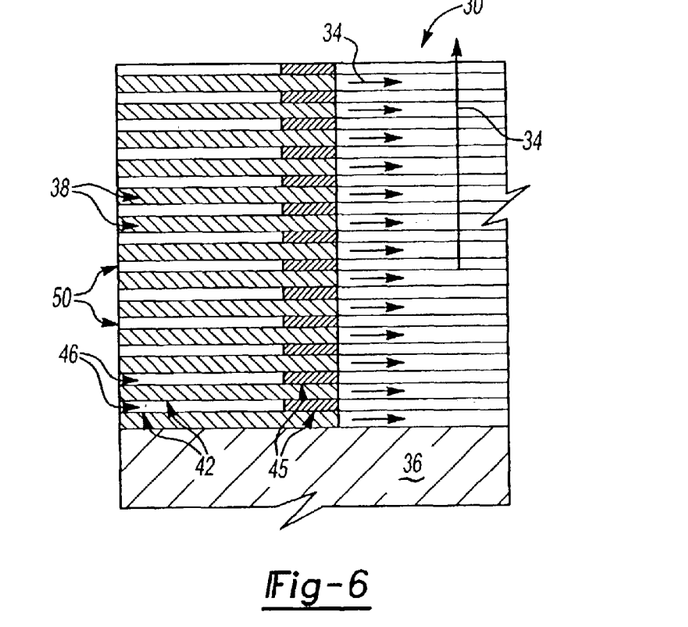
FIG. 6 is a cross sectional view of plates through the vacuum opening.

Referring to FIGS. 4–6, the fuel deoxygenator assembly 12 includes a housing 36 with fuel inlet 26 and outlet 28 along with a vacuum opening 30. The vacuum inlet 30 is in communication with the vacuum source 21(FIG. 2). Fuel flows from the fuel pump 24 to the inlet 26, through the outlet 28 to the engine 14. The assembly 12 includes a plurality of plates stacked within the housing 36 that define fuel flow passages 50 and the vacuum opening 30.

The fuel flow passages 50 are formed by a plurality of fuel plates 46 sandwiched between oxygen permeable composite membranes 42 supported by porous substrates 38. The fuel plates 46, along with the permeable composite membranes 42 define fuel flow passages 50 between the inlet 26 and outlet 28. The vacuum inlet 30 is in communication with an end of each porous substrate 38. Vacuum creates a partial pressure gradient in the direction of arrow 34. The partial pressure gradient established within each of the porous substrates 38 pulls dissolved oxygen from the fuel passages 50 through the permeable composite membrane 42 and porous substrate 38 and out the vacuum inlet 30. A seal 45 is provided to prevent leakage of fuel between fuel plates, and to provide a vacuum seal such that vacuum is pulled through the porous substrate 38.

Referring to FIG. 5, the fuel inlet 26 is shown in cross section and fuel entering the assembly 12 flows from the inlet 26 in the direction indicated by allow 32 and is dispersed into each of the plurality of fuel passages 50. The seals 45 at an end opposite of the inlet 26 prevent fuel from exiting between the fuel plates 46 and the inner surface of the housing 36. Each fuel plate 46 is sandwiched between permeable composite membrane 42. An amorphous fluoropolymer coating layer 48 is disposed on a porous backing 43 that provides the required support structure while still allowing maximum oxygen diffusion from the fuel through the porous membrane 48. In the preferred embodiment, the porous membrane 48 is coated on the porous backing 43 and a mechanical bond between the two is formed. In alternative embodiments, other bonding methods could be used (e.g., chemical bond, etc.) or other methods of disposition could be used (e.g., physical attachment, pressure, etc.) to dispose the porous membrane 49 on the porous backing 43. The porous membrane 48 consists of a 0.5–20 μm thick coating of Teflon AP 2400 on a PVDF (polyvinylidene fluoride or Kynar®) support approximately 0.005-in. thick with approximately 0.25 μm pore size. Odor supports of different material thickness and pore size can be used as long as they provide the requisite strength and openness. Preferably, each permeable membrane 48 is formed from DuPont Teflon AF amorphous fluoropolymer, however other materials known to a worker skilled in the art are also within the contemplation of this invention, such as Solvay Hyflon AD perfluorinated glassy polymer, and Asahi Glass CYTOP polyperfluorobutenyl vinyl ether. Each of the permeable composite membranes 42 is supported by the porous substrate 38.

Referring to FIG. 6, each of the porous plates 38 are in communication with the vacuum inlet 30. Vacuum is pulled in the direction indicated by arrows 34 through the inlet 30. The vacuum creates the partial pressure difference that draws dissolved oxygen from the fuel flowing through the fuel passages 50.

Figure 7:
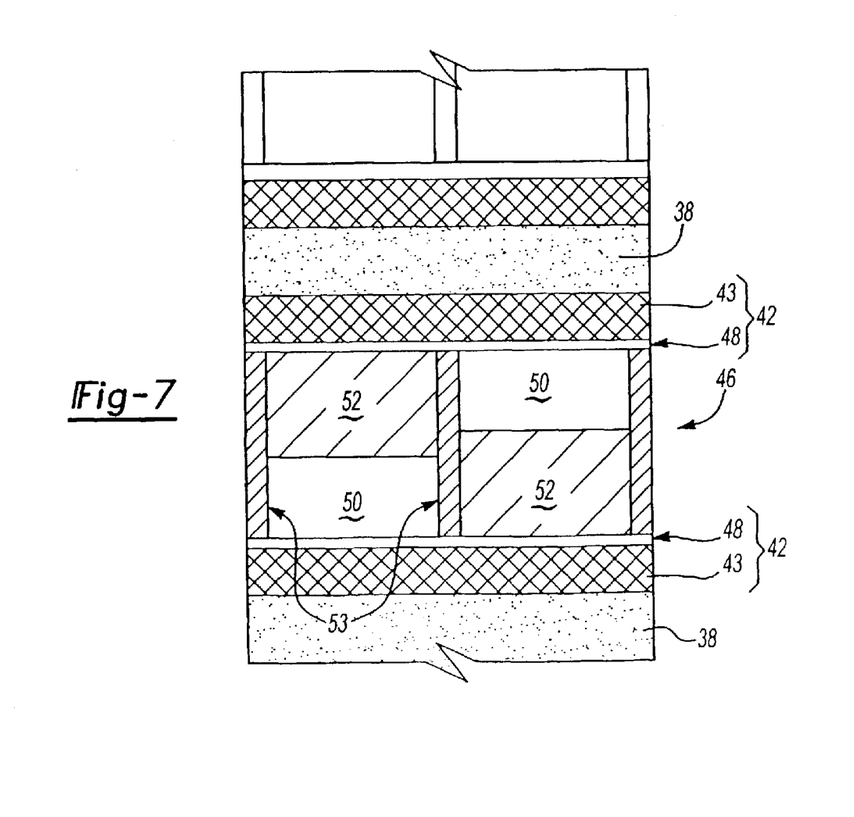
FIG. 7, is a cross-sectional view of fuel passages.

Referring to FIG. 7, the assembly 12 comprises a plurality of fuel plates 46, sandwiched between permeable composite membranes 42 and porous substrates 38. The fuel plates 46 include sides 53 that define sides of the fuel passage 50. The fuel passages 50 also include mixing members 52 that cause fuel flowing though the passages 50 to tumble and mix such that all of the fuel contacts the permeable composite membrane 42 to allow for diffusion of dissolved oxygen from the fuel.

Figure 8:
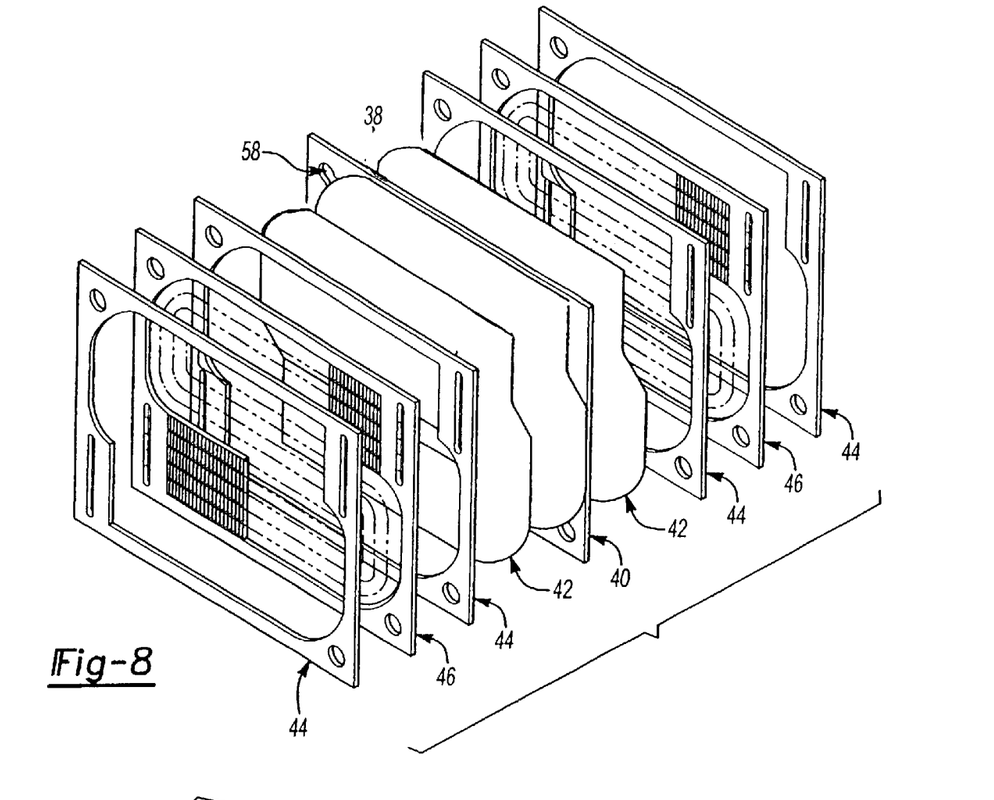
FIG. 8 is an exploded view of plates comprising fuel flow passages within the fuel deoxygenator assembly.
Figure 9:
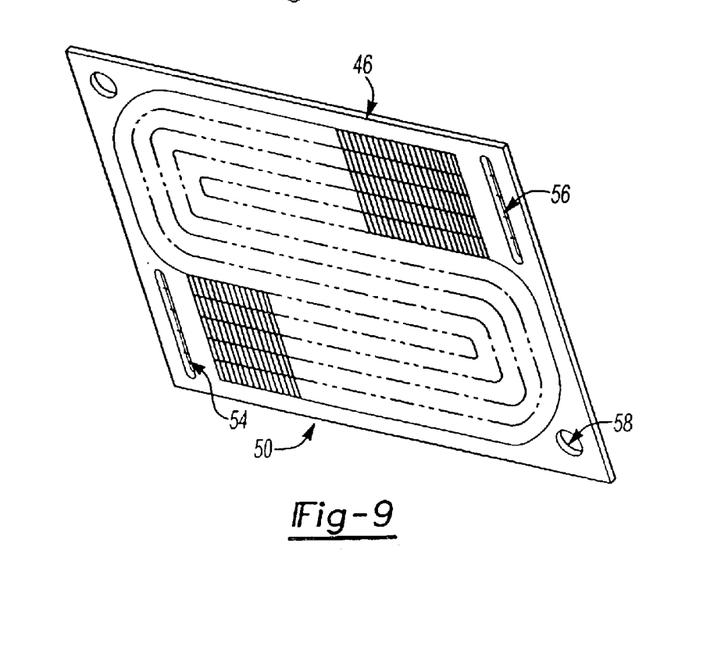
FIG. 9 is a perspective view of a fuel plate.

Referring to FIGS. 8 and 9, the fuel plates 46 are rectangular shaped. The rectangular shape provides easier configuration between specific applications because extra capacity can be varied by simply adjusting the number of fuel plates 46. Further, materials are commonly provided in rectangular form, thus economic benefits are realized during manufacture through the use of a rectangular plate. The fuel plates 46 may also be circular. Circular plates provide superior strength. One of ordinary skill in the art will recognize that alternative shapes, sizes, or configurations are suitable and within the scope of the invention.

Referring to FIG. 8, the assembly 12 is composed of a plurality of fuel plates 46 sandwiched between permeable composite membranes 42 supported by a porous substrate 38. The porous substrate 38 is a plate supported within a vacuum frame 40. The vacuum frame 40 defines inlet 58 to communicate vacuum from the opening 30 to the porous substrate 38. The porous substrate 38 is of a selected porosity enabling vacuum from the opening 30 to create an oxygen partial pressure differential between the surface of the porous substrate 38 and the inlet 58. The pore size, open volume, and thickness of the porous substrate 38 are set by the oxygen mass flux requirement. It is this oxygen partial pressure that draws dissolved oxygen through the porous membrane 42 from fuel flowing through the fuel passages 50. The porous substrate is made of a material compatible with hydrocarbon fuel. Preferably, a lightweight plastic material such as PVDF or polyethylene is used. The polyethylene plate is approximately 0.080-in. thick and includes a nominal pore size of 20 μm. Although, this is the preferable configuration, a worker having the benefit of this disclosure would understand that plate thickness and pore size can vary according to application specific parameters.

The porous composite membrane 42 is supported by the porous substrate 38 and forms a portion of the fuel passages 50. Between the porous composite membrane 42 and the fuel plate 36 is a gasket 44. The gasket 44 is as known to a worker skilled in the art and prevents fuel from leaking and from crossing over specific fuel passage defined by the fuel plate 46. In the preferred embodiment, the gasket 44 is bonded to the membrane surface 48.

The fuel plate 46 defines the fuel passages 50 between the inlet 26 and outlet 28. The fuel plate 46 only defines two sides of each fuel passage 50 and the permeable composite membrane 42 defines the remaining sides of each fuel passage 50. The configuration of the fuel passages 50 may be defined to assure that fuel is in maximum contact with the permeable composite membranes 42. One of ordinary skill in the art will recognize that the extent of contact between the fuel and permeable composite membranes 42 required is only the contact necessary to achieve the desired performance and other levels of contact are within the scope of the invention.

The specific quantity of fuel plates 46, permeable composite membranes 42 and porous plates 38 are determined by application-specific requirements, such as fuel type, fuel temperature, and mass flow demand from the engine. Further, different fuels containing differing amounts of dissolved oxygen may require differing amounts of deoxygenation to remove a desired amount of dissolved oxygen. Further, applications specific requirements govern the specific number of porous plates 38 and permeable composite membranes 42.

Referring to FIG. 9, preferably each of the fuel plates 46 are manufactured with integrally formed fuel flow passages that enhance contact between fuel and the permeable membrane 42. Enhancing contact between fuel flow and the permeable membrane optimizes mass transport of dissolved oxygen through the permeable composite membrane 42. Improving the mass transport capacity allows for a reduction in size of the deoxygenator 12 without a corresponding reduction in performance.

The fuel plate 46 includes an inlet 54 and an outlet 56. The fuel passages 50 are formed to maximize fuel exposure to the permeable composite membrane 42. This may be accomplished by providing mixing and/or optimal flow patterns for the fuel. The fuel passages 50 are formed to maximize the amount of area of the fuel in contact with the permeable membrane in order to maximize the amount of dissolved oxygen removed from the fuel. The specific size of the fuel passage 50 must be of a size to allow the required amount of fuel flow and provide optimal contact with surfaces of the permeable membrane 38. In other words, the fuel passages 50 must be small enough that fuel is in contact with the permeable membrane 42 and also must be large enough so as to not restrict fuel flow.

Another factor that will influence the oxygen removal rate is the fuel temperature. Fuel heating promotes oxygen diffusion and reduces oxygen solubility, thereby simultaneously enhancing mixing and increasing the driving force across the membrane. Therefore, in the preferred embodiment the fuel is preheated to approximately 200 F prior to entry into the deoxygenator. For many fuels, such as JP-8, heating fuel above 200 F should be avoided because thermal oxidation (coking) will begin. The temperature at which thermal oxidation begins depends on the type of fuel, impurities in the fuel, etc., and one of ordinary skill in the art will recognize that the fuel may be heated to other temperatures within the scope of the invention.

Figure 10:
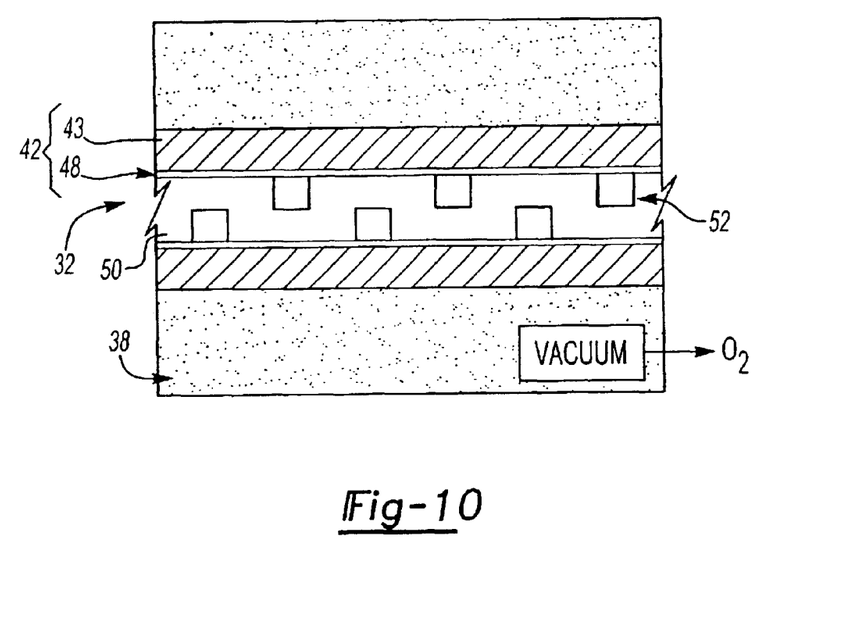
FIG. 10 is a schematic view of fuel passages defined by the fuel plate.
Figure 11:
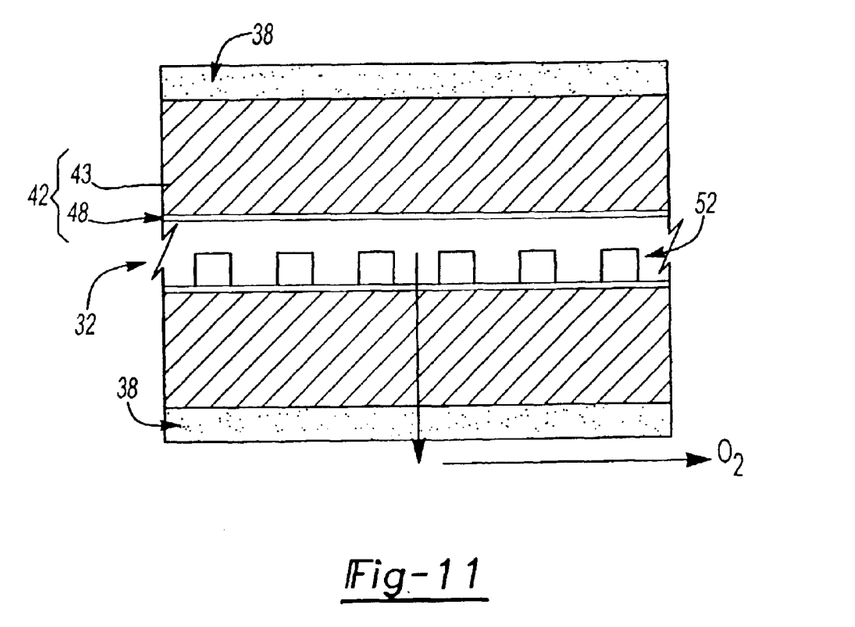
FIG. 11 is another embodiment of fuel passages defined by the fuel plate.

Referring to FIGS. 10 and 11, fuel flows through the flow passages 50 in the direction indicated by the arrow 32. The fuel plate 46 includes multiple fuel mixing members 52 disposed at alternating intervals along the flow passages 50 to create a mixing effect in the fuel. Performance of the deoxygenator 12 is related to permeability of the permeable membrane 48 and the rate of diffusion through the surface of the permeable membrane 48. The permeability of the permeable membrane 48 is controlled by the solution of oxygen into the membrane and the diffusion of oxygen through it. The permeable membrane 48 must be of a specific thickness in order to allow a desired diffusion of dissolved oxygen. Preferably, the permeable membrane 48 is approximately four microns thick. Although a four-micron thick permeable membrane 48 is used in the embodiment illustrated, it is also understood that other thicknesses of permeable membrane depending on application specific requirements are also within the contemplation of this invention. As one example, permeable membranes 48 between 0.5 microns and 20 microns are possible and within the scope of the invention.

The rate of diffusion of oxygen from the fuel through the surface of the permeable membrane 48 is affected by the duration of contact of fuel with the permeable membrane 48. It is desirable, but not required, to keep a constant contact between the permeable membrane 48 and fuel in order to maximize the amount of oxygen removed from the fuel. Optimizing the amount of diffusion of dissolved oxygen requires a balance between maximizing fuel flow and fuel temperature, and the creation of mixing to optimize contact with the permeable membrane 48, as well as accounting for minimizing pressure loss and accounting for manufacturing tolerances and costs. Without mixing, only fuel flowing along the permeable membrane 48 would be stripped of dissolved oxygen, leaving a large amount of dissolved oxygen in fuel flowing toward the center of the fuel passage 50. Dissolved oxygen contained in fuel flowing through the center of the fuel passages 50, away from the permeable membrane 48, would not migrate out of the fuel. Therefore, the fuel plate 46 enhances the diffusion of oxygen from the bulk flow to the membrane surface 48 and significantly reduces the fuel passage length or residence time required for removing more than 90 percent and preferably more than 97 percent of the dissolved oxygen, thereby suppressing coke deposition.

The mixing members 52 disposed within the fuel passages 50 encourage mixing of the fuel such that significant portions of the fuel contact the permeable membrane 48 during passage through the deoxygenator assembly 12. Although mixing is advantageous to removing dissolved oxygen from the fuel, turbulent flow produces an undesirable pressure drop. Therefore, the mixing members 52 are configured to produce a mixing effect without producing turbulent flow effects. The mixing members 52 produce a mixing of the fuel that remains within the laminar flow range. Laminar flow through the deoxygenator 12 reduces pressure drop between the inlet 26 and outlet 28. Turbulent flow may also be used, in spite of pressure drop, when it provides the desired level of mixing and an acceptable pressure loss. The mixing members 52 extend transversely relative to the direction of fuel flow indicated at 32 to cause the fuel to mix such that each portion of the fuel contacts the permeable membrane 48 in a uniform manner while flowing through the assembly 12.

Referring to FIG. 11 another embodiment of the fuel plate 46 is shown including mixing members 52 extending transversely from one side of the fuel plate 46. In this embodiment, fuel flowing over the mixing members 52 is encouraged to tumble and mix such that fuel more uniformly contacts the permeable membrane 48. It should be understood that it is within the contemplation of this invention to include any configurations, shapes, sizes, etc. of mixing members 52 or mixing enhancers, be they inertial, mechanical, acoustic or otherwise, to induce the desired amount of mixing according to application specific parameters.

Referring to FIG. 10, in operation, fuels flowing through the fuel passages 50 in the direction of arrow 32 are caused to change direction and mix by the mixing members 52 and contact the permeable membrane 48. Vacuum creates an oxygen partial pressure differential between the inner walls of the fuel passage 50 and the porous membrane 42 which causes diffusion of oxygen dissolved within the fuel to migrate into the porous substrate 38 and out of the deoxygenator assembly 12 separate from the fuel flow 32. A result of the reduced oxygen content in the fuel is an increase in the thermal oxidative stability of the fuel that is manifested by a reduction of the formation of the objectionable deposits known as "coke". The increase in the temperature at which significant "coke" occurs increases the exploitable cooling capacity of the fuel. The cooling capacity of the fuel is rated in regard to the temperature at which auto-oxidation occurs to form coke deposits on the inner surfaces of fuel systems or engine components.

Removing dissolved oxygen increases the exploitable cooling capacity allowing lower grades of fuel to operate at increased temperatures and to recover waste heat. This reduces fuel consumption costs associated with operation of an aircraft and further reduces maintenance requirements. Further, increased cooling capacity allows for operation of an engine at increased temperatures that in turn increases the overall efficiency of operating the engine. This invention provides the means of efficiently removing dissolved oxygen within fuel to increase thermal capacity thereby increasing engine operating efficiency.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A fuel deoxygenator assembly comprising:
   a housing comprising a fuel inlet and a fuel outlet;
   fuel plate defining fuel passages through said housing between said inlet and outlet;
   a permeable membrane supported by a porous substrate on a non-fuel side, said permeable membrane in contact with fuel flowing through said fuel passages on a fuel side;
   at least one opening within said housing in communication with said porous substrate for creating an oxygen partial pressure differential between said fuel side and said non-fuel side of said permeable membrane to draw dissolved oxygen out of fuel within said fuel passages.

2. The assembly of claim 1, further comprising a polytetrafluoroethylene coating disposed on said fuel side of said permeable membrane.

3. The assembly of claim 1, further comprising a perfluorinated glassy polymer disposed on said fuel side of said permeable membrane.

4. The assembly of claim 1, further comprising a polyperfluorobutenyl vinyl ether disposed on said fuel side of said permeable membrane.

5. The assembly of claim 1, comprising a vacuum source for providing a vacuum at said at least one opening for providing said oxygen partial pressure differential between said fuel passages and said porous substrate.

6. The assembly of claim 1, further comprising a second opening for a flow of strip gas through said housing in communication with said porous substrate creating said oxygen partial pressure differential.

7. The assembly of claim 1, wherein said fuel plate defines two sides of said fuel passages.

8. The assembly of claim 7, wherein said fuel plate includes a plurality of members extending between said sides of said fuel passages to induce mixing of fuel flowing through said fuel passages.

9. The assembly of claim 7, wherein said fuel plate includes an inlet portion and an outlet portion.

10. The assembly of claim 1, wherein said fuel plate is sandwiched between two of said permeable membranes such that said permeable membrane forms a portion of said fuel passages.

11. The assembly of claim 1, further comprising a plurality of said fuel plates sandwiched between a corresponding plurality of said permeable membranes disposed within said housing forming a plurality of said fuel passages.

12. The assembly of claim 11, wherein each porous substrate is sandwiched between said permeable membranes, and each fuel plate is sandwiched between said permeable membranes.

13. The assembly of claim 1, wherein said permeable membrane comprises a polytetrafluoroethylene amorphous fluoropolymer.

14. The assembly of claim 1, wherein said permeable membrane comprises a polytetraflouroethylene.

15. The assembly of claim 1, wherein a thickness of said permeable membrane is about four microns.

16. The assembly of claim 1, wherein a thickness of said permeable membrane is between 1 and 4 microns.

17. The assembly of claim 1, wherein a thickness of said permeable membrane is less than four microns.

18. The assembly of claim 1, wherein said porous substrate is a plate.

19. The assembly of claim 18, wherein said porous substrate is disposed within a vacuum frame, said vacuum frame including inlets in communication with said at least one opening.

20. The assembly of claim 1, wherein approximately 97% or more of the dissolved oxygen is removed from the fuel within said fuel passages.

21. The assembly of claim 1, wherein the fuel within said fuel passages is approximately 200 degrees Fahrenheit.

22. The assembly of claim 1, wherein the fuel within said fuel passage is more than about 150 degrees Fahrenheit.

23. The assembly of claim 1, wherein the permeable membrane is bonded to the porous substrate.

* * * * *